July 30, 1963   H. O. PETERSEN   3,099,395
IRRIGATION SYSTEMS
Filed April 12, 1962   2 Sheets-Sheet 1
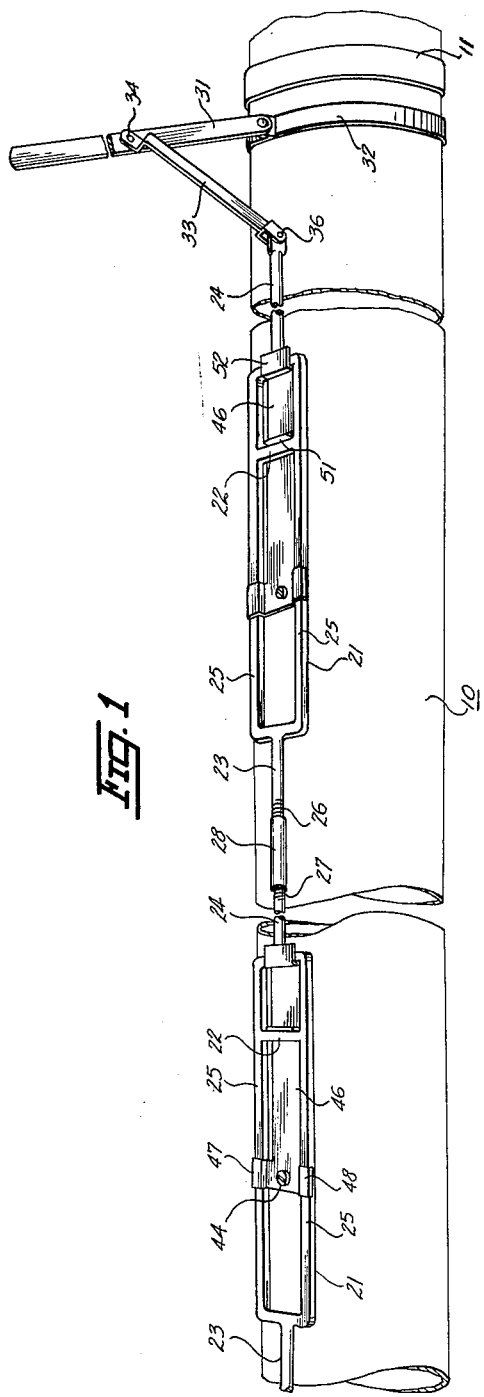
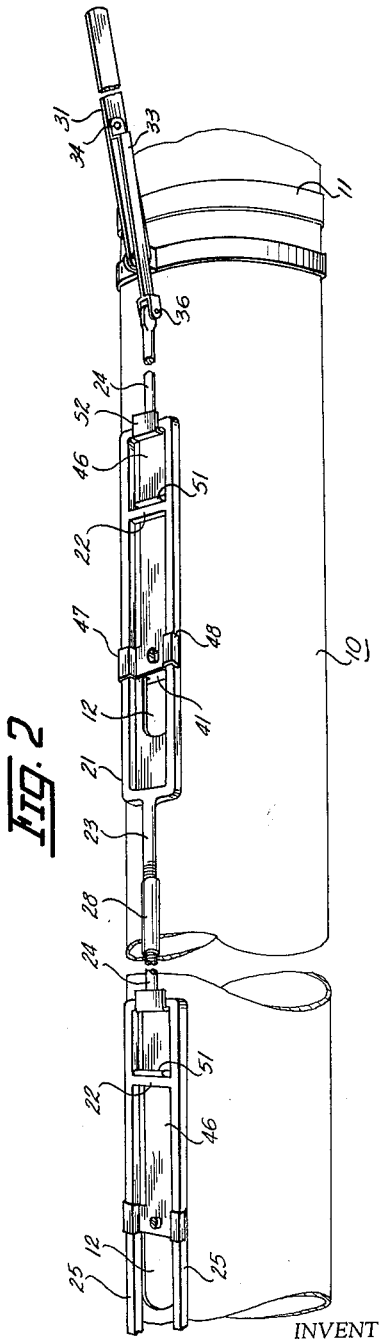
INVENTOR.
HARLIE O. PETERSEN
BY
ATTORNEYS.

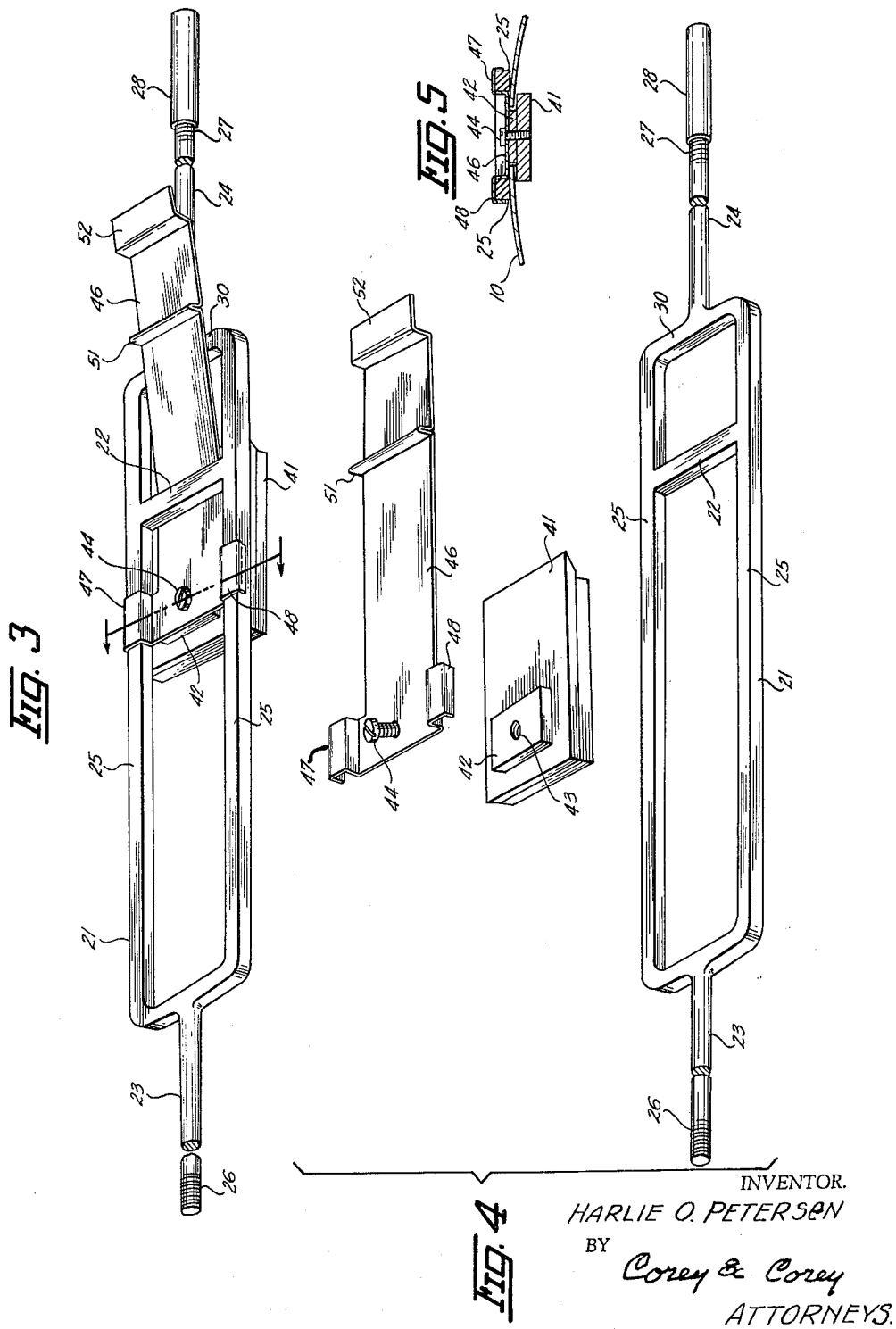

United States Patent Office 3,099,395
Patented July 30, 1963

3,099,395
IRRIGATION SYSTEMS
Harlie O. Petersen, 4012 C St., Lincoln, Nebr.
Filed Apr. 12, 1962, Ser. No. 186,970
3 Claims. (Cl. 239—562)

This invention relates to irrigating systems of the type in which relatively large light-weight pipe resting on top of the ground is utilized for irrigating first one portion of a field and then another, and in which the pipe may be readily assembled and disassembled or moved about as desired, and has particular relation to controlling the discharge of water from the ends of the pipe.

In irrigation systems of this character it is common practice to employ lengths of pipe, say six inches in diameter, and the discharge end of a pipe system might be, for instance, thirty feet in length and having nine openings therein for water gates for controlling the flow of water from the end of the pipe and distributing it in a desirable manner.

It is one of the main objects of my invention to provide a plurality of gates and a multiple control method and means for opening and closing these gates simultaneously and for selectively opening one or more gates as desired for selectively controlling the flow and discharge of water from the irrigation system.

Still another object of my invention is to provide means and a method for opening selectively one or more gates and then closing all gates by the multiple control. By selective positioning of the gates, it will be possible also to employ the multiple control for closing a partly opened gate, leaving a fully opened gate open.

Still another object of my invention is to provide an extremely simple operating structure which may be readily assembled and disassembled on the irrigation pipe to provide as many gates as necessary or desirable and to operate these gates from single operating levers or actuating means.

Other and further features and objects of the invention will be more apparent to those skilled in the art upon a consideration of the accompanying drawings and following specifications, wherein is disclosed a single exemplary embodiment of the invention, with the understanding, however, that such changes may be made therein as fall within the scope of the appended claims, without departing from the spirit of the invention.

In said drawings:

FIGURE 1 is a view in perspective of an irrigation pipe as it appears with a plurality of gates, constructed and mounted according to my invention, in the closed position together with an operating means for actuating the gates. The position of the pipe is shown with the gates at an uppermost position or substantially in the top position, but in actual use the pipe would be located with the gates at the lowest position that would let water flow out of the pipes. A lever is shown for actuating a plurality of gates at the same time, and the lever and gates are in the closed position.

FIGURE 2 illustrates the position of the actuating lever and the gates as they appear in the opened position, the yokes having been moved longitudinally of the pipe to open the gates.

FIGURE 3 illustrates the structure by which any individual gate may be manually opened to any distance desired and also illustrates how movement of the yoke to the right and then to the left would close the gate.

FIGURE 4 is a view in exploded perspective of the actuating yoke, the pad which is located inside the pipe, and a gate adapted to be secured to the pad, being the same parts as illustrated in FIGURES 1, 2 and 3, and FIGURE 5 is a view in section taken along the line 5—5 of FIGURE 3.

Referring now to the drawings:

A conventional irrigation pipe, such as here being considered, is illustrated at 10 and these pipes have couplings as at 11 to couple together as many as may be needed and without affording too much resistance to the flow of water for the irrigation project.

It is the usual practice to provide one or more of the pipes with punched elongated openings, and one or more of these pipes may be inserted in the line wherever it is desirable for water to flow from the pipes. It is the usual practice to locate the punched holes in the pipe about forty inches apart and there may be some variation in the holes. Usually the holes are elongated ovals, as illustrated at 12.

In practicing my invention, I preferably employ a yoke-like member illustrated at 21, preferably having a cross bar as illustrated at 22. The crosswise dimensions of the yoke are preferably less than that of the diameter of the pipe, and the yoke thus fits closely against the outer wall of the pipe. The yokes are provided with extended rod portions 23 and 24 at the opposite ends thereof, and these rod portions are preferably threaded as illustrated at 26 and 27 so that threaded pipe, such as illustrated at 28, may be used to connect the series of yokes.

I preferably provide an actuating mechanism such as the lever 31 which may be pivotally engaged to the clamp 32 on the pipe, and a pivoted link, as at 33, having pivotal connection at 34 with the lever and at 36 with the end of one of the rods, or a lever 33 might be connected to one of the connecting pipes as desired. The lever 31 might have to be bent sideways to some extent to clear the ground, with the pipe openings in the lowest position.

As illustrated in FIGURE 1, with the lever pushed to the left, the series of yokes 21 would be pushed to the left and the gates, which I am about to describe, would cover the openings in the pipe.

In FIGURE 2 the lever has been moved to the right and therefore the series of yokes have been pulled to the right to open up the gates to permit the escape of water from the pipe.

Continuing further with the structure of the gates, I provide a closure pad such as illustrated at 41, preferably of flexible materials such as rubber or leather or the like, and this pad is sufficiently thick that it will not bend to too great an extent under the pressure of water within the pipe. The pad 41 has a raised portion 42, preferably of metal such as bronze, aluminum or the like, and is threaded as indicated at 43 to receive the screw 44. The pads of course are the closure means and are shaped and best shown in FIGURES 3, 4 and 5.

A gate or closure pad operator or actuator, constructed according to a preferred embodiment of my invention, includes an elongated plate 46 of aluminum or steel or any other suitable material, having a pair of bent-down ears, illustrated at 47 and 48, with the ears insubstantially the cross section of half of a square so that they may readily engage to slide on the side members 25 of the yoke. The plates also have a flange 51 located near the right end of the plate and this flange is bent upwardly and returns so that the face of the plate is practically continuous. The width of the plate or gate 46 is such that it passes freely through the space between the side bars 25 of the yoke and beneath the cross bar 22.

The outer end of the plate or gate 46 is provided with an upwardly and outwardly extending flange or lip 52.

In individual operation of the gate, the flange 52 may be raised appreciably to clear the end member 30 of the yoke and then moved to the right in order to cause the pad to uncover the opening of the pipe.

In operation, when the yoke is moved to the right as by the lever illustrated in FIGURE 2, the spring pressure of the plate 46 will cause the flange 52 to engage on the inner face of the end 30 of the yoke as illustrated in FIGURES 1 and 2, so that when the operating lever is again pushed to the left, as illustrated in FIGURE 1, the flange 52 engaged against the end portion 30 will cause the gate and pad to be closed.

When it is desired to open the gate or a plurality of gates, the flange 51 of the strap 46 engages the right-hand face of the cross bar 22, and movement of the yoke to the right causes the gate and pad to be opened.

It can readily be understood then that I have provided a multiple irrigation gate or a control system having a multiple of gates, all of which can be operated from one operative member. The gates can be opened wholly or partly and closed as desired.

If it is desirable to open up one or more gates individually while the rest are closed, all that it is necessary to do is to lift up the flange 52 so that it clears the end 30 of the yoke 25 and move the plate to the right to cause the pad to uncover the opening in the pipe. The pad 41 of course is the actual closure means.

Although I have described a specific embodiment of my invention, it is apparent that modifications thereof may be made by those skilled in the art. Such modifications may be made without departing from the spirit and scope of my invention as set forth in the appended claims.

I claim as my invention:

1. An irrigation pipe having an opening therein for permitting the flow of water from the pipe as desired, means for opening and closing the opening in the pipe, including a pad within the pipe, an elongated yoke member outside of the pipe, a plate engaged at one end to the pad within the pipe and having a pair of spaced flanges thereon, one intermediate the length of the plate and another near the free end thereof, and a cross bar on the yoke located to push the intermediate flange of the plate to the right to open the opening in the pipe, and the flange at another portion further positioned from the pad and adapted to engage a second cross bar on the yoke so that movement of the second cross bar to the left will push the plate closed.

2. In an irrigation system including a pipe having an opening therein, closure means including an elongated yoke-like member straddling the opening, the yoke-like members having at least two cross members, a gate plate having ears adapted to slide on the yoke and held in place by a closure pad inside the pipe, the plate having one flange positioned so that movement of one cross member of the yoke in one direction will move the plate in a direction to cause the closure pad to uncover the opening in the pipe, and a second flange on the plate positioned so that movement of the second cross member in the opposite direction will cause it to strike the second flange and move the plate in the opposite direction to cause the closure pad to close the pipe opening.

3. In an irrigation system including a pipe having an opening therein, closure means including elongated yoke-like member straddling the opening, the yoke-like member having at least two cross members, a gate plate having ears adapted to slide on the yoke and held in place by a closure pad inside the pipe, the plate having one flange positioned so that movement of one cross member of the yoke in one direction will move the plate in a direction to cause the closure pad to uncover the opening in the pipe, and a second flange on the plate positioned so that movement of the second cross member in the opposite direction will cause it to strike the second flange and move the plate in the opposite direction to cause the closure pad to close the pipe opening, the second named flange being movable in and out of engagement with the second cross member to permit selective operation of the closure pad.

References Cited in the file of this patent

UNITED STATES PATENTS

| | | |
|---|---|---|
| 671,958 | Havard et al. | Apr. 16, 1901 |
| 1,186,226 | Parker | June 6, 1916 |
| 1,304,384 | Schlatter | May 20, 1919 |
| 2,439,539 | Cellwork | Apr. 13, 1948 |
| 2,499,738 | Folsom | Mar. 7, 1950 |
| 2,630,324 | Lay | Mar. 3, 1953 |
| 2,784,558 | Hohnstein | Mar. 12, 1957 |
| 2,976,647 | Pickrell | Mar. 28, 1961 |